(12) United States Patent
Hart et al.

(10) Patent No.: US 8,681,814 B2
(45) Date of Patent: Mar. 25, 2014

(54) WIRELESS COMMUNICATION SYSTEMS

(75) Inventors: Michael John Beems Hart, London (GB); Yuefeng Zhou, Oxshott (GB); Masato Okuda, Tokorozawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/226,344

(22) PCT Filed: Jul. 31, 2007

(86) PCT No.: PCT/GB2007/002909
§ 371 (c)(1),
(2), (4) Date: Mar. 2, 2009

(87) PCT Pub. No.: WO2008/107625
PCT Pub. Date: Sep. 12, 2008

(65) Prior Publication Data
US 2009/0219853 A1   Sep. 3, 2009

(30) Foreign Application Priority Data
Mar. 2, 2007   (GB) .................................. 0704093.4

(51) Int. Cl.
*H04J 3/22*   (2006.01)

(52) U.S. Cl.
USPC ........................................................ 370/468

(58) Field of Classification Search
USPC ............................ 370/230, 468, 329; 455/450
See application file for complete search history.

(56) References Cited

U.S. PATENT DOCUMENTS

| 4,261,054 A | 4/1981 | Scharla-Nielsen |
| 5,029,164 A | 7/1991 | Goldstein |
| 5,293,639 A | 3/1994 | Wilson |
| 5,592,154 A | 1/1997 | Lin |
| 5,724,659 A | 3/1998 | Daniel |

(Continued)

FOREIGN PATENT DOCUMENTS

| CA | 2556681 A1 | 9/2005 |
| CN | 1547862 A | 11/2004 |

(Continued)

OTHER PUBLICATIONS

Kaneko S, et al, "Proposed Relay Method with P-MP Structure of IEEE 802.16/2004" Personal, Indoor and Mobile Radio Communications, 2005. PIMRC 2005. IEEE 16th International Symposium on Berlin, Germany Sep. 11-14, 2005, Piscataway, NJ, USA, IEEE, pp. 1606-1610, XP010926479 Paragraph [0011]-paragraph [00IV].

(Continued)

*Primary Examiner* — Chandrahas Patel

(74) *Attorney, Agent, or Firm* — Smith, Gambrell & Russell, LLP

(57) ABSTRACT

A multi-hop wireless communication system, in which packets of data are transmitted over a connection between a base station (MR-BS) and a subscriber station (SS) via at least one relay station (RS), the packets of data being transmitted in accordance with one of a plurality of service classes each having a respective quality-of-service (QoS), and available bandwidth in the system being shared among a plurality of such connections in accordance with their service classes. To decrease the latency of bandwidth allocation in the system, and to support its scheduler algorithm, the RS has to know the QoS demands and the bandwidth allocating requirements of each connection.

15 Claims, 7 Drawing Sheets

(56) References Cited

U.S. PATENT DOCUMENTS

| | | |
|---|---|---|
| 6,002,690 A | 12/1999 | Takayama |
| 6,678,248 B1 | 1/2004 | Haddock |
| 6,907,212 B2 | 6/2005 | Harada |
| 7,184,703 B1 | 2/2007 | Naden |
| 7,376,122 B2 | 5/2008 | Draves, Jr. |
| 7,400,856 B2 | 7/2008 | Sartori |
| 7,454,244 B2 | 11/2008 | Kassab |
| 7,574,230 B1 | 8/2009 | Oh |
| 7,609,631 B2 * | 10/2009 | Stanwood et al. ............ 370/230 |
| 7,738,859 B2 | 6/2010 | Roy |
| 7,865,146 B2 | 1/2011 | Hart |
| 7,881,741 B2 | 2/2011 | Horiuchi |
| 7,983,151 B2 | 7/2011 | Hart |
| 8,000,651 B2 | 8/2011 | Horiuchi |
| 2001/0008520 A1 | 7/2001 | Tiedemann, Jr. et al. |
| 2002/0039383 A1 | 4/2002 | Zhu |
| 2002/0115409 A1 | 8/2002 | Khayrallah |
| 2002/0115440 A1 | 8/2002 | Hamabe |
| 2003/0097460 A1 | 5/2003 | Higashiyama |
| 2003/0123401 A1 | 7/2003 | Dean |
| 2003/0125067 A1 | 7/2003 | Takeda |
| 2003/0156554 A1 | 8/2003 | Dillinger |
| 2003/0165127 A1 | 9/2003 | Fujiwara |
| 2003/0198204 A1 | 10/2003 | Taneja |
| 2003/0202476 A1 | 10/2003 | Billhartz et al. |
| 2004/0001464 A1 | 1/2004 | Adkins |
| 2004/0123229 A1 | 6/2004 | Kim |
| 2004/0219876 A1 | 11/2004 | Baker |
| 2004/0266339 A1 | 12/2004 | Larsson |
| 2005/0014464 A1 | 1/2005 | Larsson |
| 2005/0048914 A1 | 3/2005 | Sartori |
| 2005/0048983 A1 | 3/2005 | Abraham |
| 2005/0063356 A1 | 3/2005 | Larsen |
| 2005/0213587 A1 | 9/2005 | Cho |
| 2005/0249162 A1 | 11/2005 | Kim |
| 2005/0249164 A1 | 11/2005 | Kwak |
| 2005/0272366 A1 | 12/2005 | Eichinger |
| 2005/0288020 A1 | 12/2005 | Cho |
| 2006/0040697 A1 | 2/2006 | Komatsu |
| 2006/0067243 A1 | 3/2006 | Bejerano |
| 2006/0209671 A1 | 9/2006 | Khan |
| 2006/0227796 A1 | 10/2006 | Wei |
| 2006/0264172 A1 | 11/2006 | Izumikawa et al. |
| 2007/0050495 A1 | 3/2007 | Sridhar et al. |
| 2007/0066239 A1 | 3/2007 | Hart |
| 2007/0066240 A1 | 3/2007 | Hart |
| 2007/0066241 A1 | 3/2007 | Hart |
| 2007/0066337 A1 | 3/2007 | Hart |
| 2007/0081507 A1 * | 4/2007 | Koo et al. ..................... 370/338 |
| 2007/0116106 A1 | 5/2007 | Hart |
| 2008/0009243 A1 | 1/2008 | Hart |
| 2008/0049718 A1 | 2/2008 | Chindapol |
| 2008/0165720 A1 | 7/2008 | Hu |
| 2008/0225774 A1 | 9/2008 | Kim |
| 2009/0185479 A1 | 7/2009 | Hart |
| 2010/0110973 A1 | 5/2010 | Hart |
| 2010/0111027 A1 | 5/2010 | Hart |

FOREIGN PATENT DOCUMENTS

| | | |
|---|---|---|
| CN | 1859364 A | 7/2005 |
| EP | 1388936 A2 | 2/2004 |
| EP | 1753188 A1 | 2/2007 |
| EP | 1761080 A1 | 3/2007 |
| EP | 1773091 A2 | 4/2007 |
| EP | 1801995 A1 | 6/2007 |
| GB | 2440982 A | 2/2008 |
| GB | 2440984 A | 2/2008 |
| GB | 2440985 A | 2/2008 |
| GB | 2443466 A | 5/2008 |
| GB | 2443465 A | 7/2008 |
| JP | 3166831 A | 7/1991 |
| JP | 6505371 | 8/1992 |
| JP | 7264651 A | 10/1995 |
| JP | 2002185382 A | 6/2002 |
| JP | 2003124876 A | 4/2003 |
| JP | 2003258719 A | 9/2003 |
| JP | 2004032393 A | 1/2004 |
| JP | 2004173123 A | 6/2004 |
| JP | 2005033625 A | 2/2005 |
| JP | 2005142676 A | 6/2005 |
| JP | 2005142968 A | 6/2005 |
| JP | 2005159900 A | 6/2005 |
| KR | 1020030049031 A1 | 6/2003 |
| WO | 9214309 A1 | 8/1992 |
| WO | 9746038 A2 | 12/1997 |
| WO | WO 98/36509 A1 | 8/1998 |
| WO | 0077948 A1 | 12/2000 |
| WO | 0150635 A1 | 7/2001 |
| WO | 0163849 A2 | 8/2001 |
| WO | 03044970 A2 | 5/2003 |
| WO | 2004075468 A2 | 9/2004 |
| WO | 2004107693 A1 | 12/2004 |
| WO | 2004112282 A1 | 12/2004 |
| WO | 2005013507 A1 | 2/2005 |
| WO | 2005020517 A1 | 3/2005 |
| WO | 2005025110 A3 | 3/2005 |
| WO | 2005053338 A1 | 6/2005 |
| WO | 2005064872 A1 | 7/2005 |
| WO | 2005088914 A1 | 9/2005 |
| WO | 2005125109 A2 | 12/2005 |
| WO | 2006020032 A1 | 2/2006 |
| WO | 2006080507 A1 | 8/2006 |
| WO | 2006099024 A2 | 9/2006 |
| WO | 2006101013 A1 | 9/2006 |
| WO | 2006130964 A1 | 12/2006 |
| WO | 2007003142 A1 | 1/2007 |
| WO | 2007019672 A1 | 2/2007 |
| WO | 2007028252 A2 | 3/2007 |

OTHER PUBLICATIONS

Daehyon Kim, et al. "Fair and efficient multihop scheduling algorithm for IEEE 802.16 BWA systems" Broadband Networks, 2005 2nd international Conference on Boston MA Oct. 3-7, 2005, Piscataway, NJ, USA, IEEE pp. 895-901 the whole document.

Christian Hoymann et al. "Multihop Communication in Relay Enhanced IEEE 802.16 Networks" Personal, Indoor and Mobile Radio Communications, 2006 IEEE 17th International Symposium on, IEEE, PI Sep. 11, 2006, pp. 1-4, XP002462917 the whole document.

IEEE Std 802.16-2004 IEEE Standard for Local and metropolitan area networks Part 16: Air Interface for Fixed Broadband Wireless Access Systems IEEE Computer Society and the Microwave Theory and Techniques Society, Oct. 1, 2004.

IEEE Std 802.16e-2005 and IEEE Std 802.16-2004/Cor1-2005 IEEE Standard for Local and metropolitan area networks Part 16: Air Interface for Fixed and Mobile Broadband Wireless Access Systems Amendment 2: Physical and Medium Access Control Layers for Combined Fixed and Mobile Operation in Licensed Bands and Corrigendum 1, Feb. 28, 2006.

Search report issued in priority United Kingdom application No. 0704093.4 dated Jul. 3, 2007.

International Search report issued in PCT/GB2007/002909 dated Mar. 2, 2007.

Apostolopoulos, J.G. et. al. "Source-Channel Diversity for Parallel Channels" IEEE Transactions on Information Theory, IEEE Service Center, Piscataway, NJ, US, vol. 51, No. 10, Oct. 2005, pp. 3518-3539, XP011139661.

British Search Report for Application No. GB0622120.4 dated Dec. 6, 2006.

Communication dated Sep. 30, 2008 forwarding Extended European Search Report in European Application No. 08151572.8-1246 with abstract and narrative.

European Search Report; EP 0525 3768 dated Oct. 14, 2005.

First Notification of Office Action dated Apr. 3, 2009 received in corresponding Chinese Application No. 200610172053.7.

Advisory Action dated Apr. 29, 2010 received in U.S. Appl. No. 11/454,028.

European Search Report; EP 05253785 dated Oct. 19, 2005.

(56) References Cited

OTHER PUBLICATIONS

European Search Report; EP 05253766 dated Oct. 13, 2005.
Final Office Action dated Dec. 28, 2010 received in U.S. Appl. No. 11/454,028.
European Office Action issued Jan. 17, 2011 in application 07 766 391.2-2415.
Mona Ghassemian, Vasilis Friderikos, Hamid Aghvami; Hybrid Handover in Multihop Radio Access Networks; Sep. 2005; document No. XP-010855829.
IEEE Std. 802.11g-2003 IEEE Standard for Information technology—Telecommunications and information exchange between systems—Local and metropolitan area networks—Specific requirements Part 11: Wireless LAN Medium Accedd Control (MAC) and Physical Layer (PHY) specifications Amendment 4: Further Higher Data Rate Extension in the 2.4 Ghz Band IEEE Computer Society, Jun. 27, 2003.
Non-Final Office Action dated Apr. 10, 2009 received in U.S. Appl. No. 11/454,028.
Zhang Jingmei et al.: "Adaptive optimal transmit power allocation for two-hop non-regenerative wireless relaying system", Vehicular Technology Conference, 2004. VTC 2004-spring. 2004 IEEE 59th Milan, Italy May 17-19, 2004, Piscataway, NJ, USA, IEEE, US, vol. 2, May 17, 2004, pp. 1213-1217.
IEEE 802.11 a/g standard: "Wireless LAN Medium Access Control (MAC) and Physical Layer (PHY) specifications" Jun. 27, 2003.
International Search Report for PCT/GB2007/002902(dated Dec. 14, 2007.
International Search Report dated Oct. 25, 2007 for PCT/GB2007/002891.
Non-Final Office Action dated Jan. 5, 2010 received in U.S. Appl. No. 11/637,025.
Final Office Action dated Jul. 6, 2010 recevied in U.S. Appl. No. 11/637,025.
Non-Final Office Action dated Aug. 23, 2010 rec'd in U.S. Appl. No. 12/613,342.
Non-Final Office Action dated Jun. 16, 2010 received in U.S. Appl. No. 12/613,367.
Non-Final Office Action dated Nov. 29, 2010 received in U.S. Appl. No. 11/453,055.
Final Office Action dated Mar. 24, 2010 received in U.S. Appl. No. 11/453,055.
Non-Final Office Action dated Jul. 16, 2009 received in U.S. Appl. No. 11/453,055.
Final Office Action dated Jun. 16, 2010 received in U.S. Appl. No. 11/453,844.
Non-Final Office Action dated Sep. 30, 2009 received in U.S. Appl. No. 11/453,844.
Notice of Allowance dated Oct. 22, 2010 received on U.S. Appl. No. 11/453,844.
Extended European Search Report dated Feb. 8, 2011 received in 09173072.1-1246/2144466.
Extended European Search Report dated Feb. 14, 2011 received in 09173073.9-1246/2144472.
Extended European Search Report dated Feb. 14, 2011 received in 09173074.7-1246/2144473.
Advisory Action dated Jul. 2, 2010 received in U.S. Appl. No. 11/453,055.
Extended European Search Report dated Feb. 2, 2011 received in 06252979.7-1246/1734669.
Final Office Action dated Mar. 9, 2011 received in U.S. Appl. No. 12/613,342.
Final Office Action dated Dec. 15, 2009 received in U.S. Appl. No. 11/454,016.
Final Office Action dated Jan. 25, 2011 received in U.S. Appl. No. 12/613,367.
Non-Final Office Action dated Dec. 9, 2010 received in U.S. Appl. No. 11/454,016.
Non-Final Office Action dated Apr. 9, 2009 received in U.S. Appl. No. 11/454,016.
Notice of Allowance dated Jan. 13, 2011 received in U.S. Appl. No. 11/453,839.
Non-Final Office Action dated Jun. 8, 2010 received in U.S. Appl. No. 11/453,839.
Notice of Allowance dated May 23, 2011 received in U.S. Appl. No. 11/453,839.
Final Office Action dated Dec. 15, 2009 received in U.S. Appl. No. 11/454,028.
Non-Final Office Action dated Jun. 30, 2010 received in U.S. Appl. No. 11/454,028.
European Search Report EP05253784 dated Oct. 17, 2005.
First Notification of Office Action in corresponding 200610095607.8 dated Feb. 6, 2009.
Sreng V. et al.: Relayer selection strategies in cellular networks with peer-to-peer relaying, Vehicular Technology Conference, 2003. 2003 IEEE 58th Orlando, Fl., USA Oct. 6-9, 2003, Piscataway, NJ, USA, IEEE, US, Oct. 6, 2003, pp. 1949-1953.
Office Action dated Jul. 5, 2011 received in corresponding Japanese Patent Application No. 2009-091471.
Final Office Action dated Aug, 2, 2010 received in U.S. Appl. No. 11/453,045.
Non-Final Office Action dated Jan. 6, 2011 received in U.S. Appl. No. 11/453,045.
Extended European Search Report dated Mar. 1, 2010 received in corresponding European Patent No. 09172393.2-2416/2141870.
Non-Final Office Action dated Dec. 1, 2009 received in U.S. Appl. No. 11/453,045.
Non-Final Office Action dated Jun. 27, 2011 received in U.S. Appl. No. 12/226,319.
European Search Report: EP 0525 3767 dated Oct. 17, 2005.
European Search Report dated Oct. 18, 2005 received in EP05253783.
United Kingdom Search Report dated Apr. 19, 2007 for application No. GB0705225.1.
United Kingdom Search Report dated May 23, 2007 for application No. GB0705225.1.
Non-Final Office Action dated Jun. 22, 2011 received in U.S. Appl. No. 11/637,025.
Non-Final Office Action dated Jun. 16, 2011 received in U.S. Appl. No. 11/454,028.
Final Office Action dated Jun. 23, 2011 received in U.S. Appl. No. 11/453,045.
Japanese Office Action date May 10, 2011 received in JP2006-167984.
Notice of Allowance dated Jul. 28, 2011 received in U.S. Appl. No. 11/453,839.
Notice of Allowance dated Apr. 26, 2011 received in U.S. Appl. No. 11/453,839.
Final Office Action dated May 2, 2011 received in U.S. Appl. No. 11/454,016.
Final Office Action dated May 17, 2011 received in U.S. Appl. No. 11/453,055.
Non-Final Office Action dated May 20, 2011 received in U.S. Appl. No. 12/973,086.
Japanese Office Action dated May 10, 2011 received in JP2006-167982.
Japanese Office Action dated Jun. 14, 2011 received in JP2009-535780.
Japanese Office Action dated Jun. 28, 2011 received in JP2009-091469.
Chinese Office Action dated Aug. 12, 2011 received in 200780033647.2.
Japanese Office Action dated May 24, 2011 received in JP2006342666.
Japanese Office Action dated May 31, 2011 received in JP2006167981.
Japanese Office Action dated Feb. 1, 2011 received in corresponding Japanese Patent Application 2006167985.
Japanese Office Action dated May 10, 2011 received in corresponding Japanese Patent Application 2006167983.
Final Office Action dated Oct. 14, 2011 received in U.S. Appl. No. 12/226,319.

(56) References Cited

OTHER PUBLICATIONS

Final Office Action dated Oct. 25, 2011 received in U.S. Appl. No. 12/226,344.
Non-Final Office Action dated Oct. 31, 2011 received in U.S. Appl. No. 12/301,414.
Notice of Allowance dated Nov. 7, 2011 received in U.S. Appl. No. 11/453,839.
Notification of Reason for Refusal dated Sep. 6, 2011 received in corresponding Japanese Patent Application 2006167986.
Notice of Allowance dated Nov. 23, 2011 received in U.S. Appl. No. 12/973,086.
Notice of Allowance dated Sep. 28, 2011 received in U.S. Appl. No. 12/973,086.
Non-Final Office Action dated Jan. 26, 2012 received in U.S. Appl. No. 12/226,319.
Notice of Allowance dated Jan. 19, 2012 received in U.S. Appl. No. 11/454,028.
Decision of Refusal dated Oct. 11, 2011 received in Japanese Patent Application No. 2006-167984.
Decision of Refusal dated Oct. 11, 2011 received in Japanese Patent Application No. 2006-167982.
Japanese Office Action dated Dec. 13, 2011 received in JP2009-529749.
Final Office Action dated Sep. 29, 2011 received in U.S. Appl. No. 11/454,016.
Advisory Action dated Apr. 23, 2010 received in U.S. Appl. No. 11/454,016.
Non-Final Office Action dated Jan. 12, 2012 received in U.S. Appl. No. 12/613,367.
Notice of Allowance dated Dec. 22, 2011 received in U.S. Appl. No. 11/453,839.
Non-Final Office Action dated Feb. 7, 2012 received in U.S. Appl. No. 12/613,342.
Notice of Allowance dated Mar. 8, 2012 received in U.S. Appl. No. 12/301,414.
Japanese Office Action dated Mar. 21, 2012 received in JP2009-530924.
Notification of Reasons for Refusal dated Apr. 24, 2012 received in JP2006-167986.
Final Notification for Reasons for Refusal dated Feb. 14, 2012 received in JP2009-535780.
Modification for Enabling RS Operations dated Nov. 2005 by Tzu-Ming Lin, Chang-Lung Hsiao, Rodger Tseng and Wem-Ho Sheen ITRI Computer and Communications Research Labs, Tawain, R.O.C.
Notice of Allowance received in U.S. Appl. No. 11/454,028 dated May 24, 2012.
Japanese Office Action dated May 29, 2012 received in Japanese Patent Application No. JP2011-081524.
Non-Final Office Action dated Jul. 10, 2012 received in U.S. Appl. No. 12/226,319.
Non-Final Office Action dated Aug. 2, 2012 received in U.S. Appl. No. 11/453,055.
Final Office Action dated Aug. 14, 2012 received in U.S. Appl. No. 12/613,342.
Final Office Action dated Aug. 23, 2012 received in U.S. Appl. No. 12/613,367.
Non-Final Office Action dated Nov. 20, 2012 received in U.S. Appl. No. 12/226,319.
Non-Final Office Action dated Oct. 3, 2012 received in U.S. Appl. No. 13/168,500.
Final Office Action dated Dec. 14, 2012 received in U.S. Appl. No. 11/453,055.
Non-Final Office Action dated Jan. 10, 2013 received in U.S. Appl. No. 12/613,342.
Notice of Allowance dated Jan. 16, 2013 received in U.S. Appl. No. 11/454,028.
Japanese Office Action dated Mar. 12, 2013 received in Patent Appeal No. 2012-516.
Notification of Reason(s) for Refusal dated Dec. 18, 2012 received in Japanese Patent Application No. 2011-191107.
Non-Final Office Action dated Jan. 9, 2013 received in U.S. Appl. No. 12/613,367.
Non-Final Office Action dated Jan. 9, 2013 received U.S. Appl. No. 11/454,016.
Notice of Allowance dated Aug. 16, 2013 received in U.S. Appl. No. 12/613,367.
Non-final Office Action dated Apr. 22, 2013 received in U.S. Appl. No. 12/226,319.
Non-final Office Action dated Jun. 17, 2013 received in U.S. Appl. No. 12/513,805.
Notice of Allowance dated Jun. 21, 2013 received in U.S. Appl. No. 11/454,028.
Final Office Action dated Jul. 9, 2013 received in U.S. Appl. No. 13/168,500.
Notice of Allowance dated Aug. 5, 2013 received in U.S. Appl. No. 12/613,342.
Non-Final Office Action dated Jul. 24, 2013 received in U.S. Appl. No. 12/226,319.
Non-Final Office Action dated Jul. 19, 2013 received in U.S. Appl. No. 11/453,055.
3rd Notification of Chinese Office Action dated Jul. 15, 2013 received in Application No. 200910167069.2.
Final Office Action dated Oct. 1, 2013 received in U.S. Appl. No. 11/454,016.
Notice of Allowance dated Nov. 6, 2013 received in U.S. Appl. No. 12/226,319.
non-final Office Action dated Oct. 31, 2013 received in U.S. Appl. No. 13/168,500.

* cited by examiner

WIRELESS COMMUNICATION SYSTEMS

TECHNICAL FIELD

The present invention relates to wireless communication systems, more particularly to multi-hop systems in which a base station (BS or MR-BS) communicates with multiple fixed or mobile subscriber stations (SS) via one or more relay stations (RS).

BACKGROUND ART

Recently, various standards have been developed for data communication over broadband wireless links. One such standard is set out in the IEEE 802.16 specifications and is commonly known as WiMAX. The specifications include IEEE 802.16-2004, primarily intended for systems having fixed subscriber stations, and an enhanced specification IEEE 802.16e-2005 which among other things provides for mobile subscriber stations. In the following description, the term subscriber station (SS) applies to both fixed and mobile stations (SS/MS).

The entire content of IEEE Std 802.16-2004 "Air Interface for Fixed Broadband Wireless Access Systems" is hereby incorporated by reference. IEEE 802.16 envisages single-hop systems in which the subscriber station communicate directly with a base station within range, the range of a base station defining a "cell". By deploying multiple base stations at suitable positions within a given geographical area, a contiguous group of cells can be created to form a wide-area network. In this specification, the terms "network" and "system" will be used equivalently.

In systems of the above type, data is communicated by exchange of packets between the subscriber stations and base station whilst a connection (management connection or transport connection) is maintained between them. The direction of transmission of packets from the subscriber station to the base station is the uplink (UL), and the direction from the base station to the subscriber station is the downlink (DL). The packets have a defined format which follows a layered protocol applied to the system and its component radio devices. Protocol layers relevant to packets as such are the so-called physical layer (PHY) and media access layer (MAC). In the IEEE 802.16-2004 specification, these protocol layers form a protocol "stack" as shown in FIG. 1. Incidentally, FIG. 1 also shows interfaces between protocol layers in the form of service access points (SAPs), though these are not relevant to the present invention.

The media access layer is responsible for handling network access, bandwidth allocation, and maintaining connections. This includes controlling access of the BS and SS's to the network on the basis of "frames" which are divided in the time domain into a number of slots. Data is exchanged between the MAC peer entities, in other words, between the subscriber station and base station, in units of a protocol data unit (PDU), the PDU being conveyed across the PHY layer using a number of slots. Thus, a "slot" is a unit of time used for allocating bandwidth. The MAC is divided into sublayers including a security sublayer (see FIG. 1) for allowing authentication, key exchange and encryption of PDUs.

Various physical layer implementations are possible in a IEEE 802.16 network, depending on the available frequency range and application; for example, both a time division duplex (TDD) mode—in which uplink and downlink transmissions are separated in time but may share the same frequency—and a frequency division duplex (FDD) mode—where uplink and downlink transmissions can occur at the same time but on different frequencies—are possible. The PHY layer also defines the transmission technique such as OFDM (orthogonal frequency division multiplexing) or OFDMA (orthogonal frequency division multiple access). At present, OFDMA is of most relevance for multi-hop systems of the kind with which the present invention is concerned. A connection between a base station and subscriber station (more precisely, between MAC layers in those devices—so-called peer entities) is assigned a connection ID (CID) and the base station keeps track of CIDs for managing its active connections.

The subsequent description will refer to the TDD mode by way of example. In TDD, each frame is subdivided into a DL-subframe and an UL-subframe. FIG. 3 shows a TDD frame structure illustrating, within the UL-subframe, a packet format having two parts, a PHY header and a MAC PDU. The MAC PDU in turn consists of a MAC header, an optional payload, and optional error correction code (cyclic redundancy code or CRC). The PHY header includes training sequences, frequency band allocation information, and other information relating to physical layer parameters. Within the MAC PDU, the MAC header normally gives essential parameters for media access, such as the type of PDU, MAC address, and type of MAC signalling etc. The CRC within MAC PDU is optional, and can be used to check the received MAC PDU. The payload within MAC PDU is used to contain the data which the SS wishes to send to the BS, but is also optional. For example, some controlling messages, such as a bandwidth request, or an ACK message, have no payload. The payload could be data from higher layer, or sub-MAC-header, which can give additional MAC information.

FIG. 3 also shows, as part of the UL-subframe, an area (request contention field) which consists of a number of request opportunities, used for contention-based bandwidth requests as discussed below. In the case of the TDD mode, bandwidth is allocated on a timing basis, e.g. by allocating slots within frames for the exclusive use of a particular connection (service flow). Meanwhile, the DL-subframe includes a broadcast control field with a DL-MAP and UL-MAP, by which the BS informs the receiving device of the frame structure. The MAP is a map of bandwidth allocation in the frame and consists of Information Elements (IE) each containing a connection ID. Thus, in a TDD mode network, bandwidth allocation means the allocation of resources (slots) within frames. The DL-MAP and UL-MAP are examples of management messages broadcast by the BS (that is, transmitted to all subscribers). Other management messages include an Uplink Channel Descriptor UCD and Downlink Channel Descriptor DCD (both shown in FIG. 3), and Dynamic Service Request and Response (DS-REQ and -RSP) messages.

The concept of quality of service (QoS) is employed in wireless communication systems for allowing a wide range of services to be provided. Depending upon the kind of service being provided (see below), packets may need to be transmitted with a certain accuracy and/or within a certain time delay or they may be useless, and possibly require re-transmission. Thus, during communication with a subscriber station, the base station allocates a QoS level depending on the type of service requested by the subscriber station and available bandwidth, bearing in mind that the base station typically will be communicating with several subscriber stations simultaneously. The QoS parameters take into account priority of transmission (time delay or latency), accuracy of transmission (error rate) and throughput (data rate).

The BS uses a scheduler (scheduling algorithm) to manage the bandwidth (e.g. slot) allocations for all the currentlyactive connections, balancing the needs of the various subscribers. That is, each SS has to negotiate only once for network entry, after which it is allocated bandwidth by the BS which, though it may increase or decrease on request from the SS or under other demands on the network, remains assigned to that SS thus keeping the connection active. Each connection has a service class and an associated QoS. The QoS is allocated first during a network entry procedure (connection set-up phase) at the time the subscriber station joins the network, and may be modified subsequently by the subscriber station making a request to the base station whilst the connection is maintained. This may involve assigning additional bandwidth to the connection, perhaps repeatedly, depending on available resources in the network.

The relationship between QoS and CID/SFID is illustrated in FIG. 2. For ease of understanding FIG. 2, it is noted that "service flow" refers to transmission of data in a given direction (uplink or downlink) on a connection having a particular QoS. The QoS of the connection is defined by a service flow identifier (SFID) which has a one-to-one relationship to the connection ID. Strictly speaking, it is the service flow (or the connection) to which bandwidth is allocated, but it is convenient to think of bandwidth being assigned by the BS to the SS involved in the connection.

For example, the IEEE 802.16-2004 specification provides four QoS classes or service levels as follows:

(i) Unsolicited Grant Service (UGS):

This service supports real-time data streams consisting of fixed-size packets issued at periodic intervals, such as voice calls (VoIP), in which the packets cannot be delayed appreciably without making the voice call unintelligible. To support this service with small latency, BS will directly grant bandwidth to SS periodically.

(ii) Real-time Polling Service (rtPS):

This supports real-time data streams consisting of variable-sized packets issued at periodic intervals, such as MPEG video. To support this service type, BS shall provide periodic unicast request opportunities, and the SS can send bandwidth request MAC headers by using these opportunities.

(iii) Non-real-time Polling Service (nrtPS):

A service level intended to support delay-tolerant data streams consisting of variable-sized packets for which a minimum transfer rate is needed, such as FTP (File Transfer Protocol). The BS typically polls nrtPS service connection on an interval on the order of one second or less.

(iv) Best Effort (BE)

This lowest service level is for data streams with no particular service requirements. Packets are handled as and when bandwidth is available, with contention-based CDMA-based bandwidth requests (see below) being used by the SS to obtain bandwidth. That is, only if the bandwidth request is sent to the base station without colliding with competing requests from other SS, is the request granted.

In addition, IEEE802.16e-2005 introduces a further service class which is a combination of UGS and rtPS, as follows:

(v) Extended rtPS (ertPS)

A service level intended to facilitate, for example, voice-over IP (VoIP). To support the QoS demand of this service type, BS shall make either unicast grants in an unsolicited manner or periodic polling for SS. This service level is suitable for real-time service flows that generate variable-size data packets on a periodic basis.

In legacy single hop systems (e.g. 802.16-2004 and 802.16e-2005), each mobile station (MS) or subscriber station (SS) may request bandwidth (BW) from the base station (BS), or BS may grant bandwidth to MS/SS directly, thus sharing the access to radio resources. The method of requesting or allocating bandwidth depends on the service class of the connection, more particularly their QoS demands, but basically four methods can be used as follows:

a) Contention based Bandwidth request: The resources are given on a demand assignment basis. Firstly, the SS will send a CDMA code to BS, and then BS will poll this SS for small amount of bandwidth. The SS will use this polled bandwidth to send a bandwidth request MAC header to BS to apply bandwidth for a specific service. When BS receives this bandwidth request, the BS could grant bandwidth to the specific service, such as the Best Effort service mentioned above. FIG. 5 illustrates a packet format used for such a bandwidth request, and FIG. 6 illustrates the signal flow between the MS and BS in this case.

b) Polling: Polling is the process by which the BS allocates to the Subscriber station bandwidth specifically for the purpose of making bandwidth requests, e.g. SS can use this polled bandwidth for sending bandwidth MAC header.

c) Grants: BS can directly give bandwidth to SS periodically by sending Data Grant Burst IEs. This method has smaller latency.

d) Piggybacked bandwidth request: a extension of (a) in which the SS first uses a contention-based bandwidth request to obtain some initial bandwidth, then sends a specific bandwidth request message (or "piggyback" bandwidth request, in which the bandwidth request information is contained in another message) to the BS to obtain more bandwidth.

The BS and SS will know the QoS parameters and the class of each service flow after creating service flows. QoS parameters (and hence QoS information) include: minimum reserved traffic rate; maximum latency; maximum sustained traffic rate, request/transmission policy; tolerated jitter, traffic priority, and unsolicited polling interval. Not all of these parameters are applicable to every service class.

To support addressing and QoS control, some wireless communication systems put connection identification (CID) into a MAC header. For instance, in WiMAX, the service flow between SS/MS and BS can be created and activated during network entry procedure or by dynamic service flow procedure. As mentioned earlier, a service flow ID (SFID) will be assigned to each existing service flow, and each service flow is also associated to a specific QoS demand. A service flow has at least an SFID and an associated direction. The connection ID (CID) of the transport connection exists only when the service flow is admitted or active. The relationship between SFID and transport CID is unique, which means an SFID shall never be associated with more than one transport ID, and a transport CID shall never be associated with more than one SFID.

FIG. 4 shows a generic MAC header format as specified in IEEE 802.16-2004, including a 16-bit CID. FIG. 5 shows an example of a generic bandwidth request, and FIG. 6 shows the conventional signal flow during bandwidth allocation between a BS and MS in a single-hop system.

In single hop wireless communication systems (e.g. IEEE802.16-2004 and IEEE802.16e-2005 as mentioned above), each subscriber station (SS or MS) can communicate with the base station (BS) directly as illustrated in FIG. 6. Recently, efforts are being made to extend IEEE 802.16 to multi-hop (MR) configurations in which traffic between BS and SS is routed via one or more relay stations (RS), rather than being transmitted directly. FIG. 7 shows an example of such a configuration having two relay stations labelled RS1# and RS2#. In this case, the base station is referred to as an MR-BS (Multi-Hop Relay Base Station) since it has extended functionality to support MR. If the network is modified to support relaying functionality as shown in FIG. 7, normally, the relay station (RS) will relay all the packets from the radio devices (subscriber stations or other relay stations) within its coverage, to the MR-BS. FIG. 8 shows one possible signal flow for bandwidth allocation in such a multi-hop system.

In multi-hop relay (MR) systems with distributed scheduling, the MR-BS (Multi-Hop Relay Base Station) shall allocate the bandwidth for relay uplink, which is used for RS to send data to MR-BS; meanwhile, the RS shall allocate the bandwidth for access uplink, which is used for SS to send data to RS. In other words each RS in the MR system requires its own scheduler for allocating bandwidth to the connections in which it is involved. The bandwidth allocation process becomes considerably involved as shown in FIG. 8.

The BS and SS both know the QoS parameters and the service classes of each service flow after creating service flows. However, the RS doesn't know the QoS information of each created service flow, which introduces inconsistency of bandwidth request procedures over relay uplink and access uplink. In addition, the RS may lack knowledge which it requires for its own scheduler algorithms. These problems may increase latency in the network.

Thus, there is a need to reduce the latency involved in bandwidth allocation within a multi-hop relay wireless communication system. More particularly, there is a need for the RS to know at least some QoS information of all service flows in which it is involved, in order to schedule properly.

DISCLOSURE OF INVENTION

According to a first aspect of the present invention, there is provided a base station for use in a wireless communication system in which packets of data are transmitted over a connection between the base station and a subscriber station via at least one relay station, the packets of data being transmitted in accordance with one of a plurality of service classes each having a respective QoS, and available bandwidth in the system being shared among a plurality of such connections in accordance with their service classes, the base station comprising:

connection defining means for setting up a said connection having one of said service classes with the subscriber station and generating associated connection information; and connection notifying means for informing the relay station of the connection information for assisting the relay station to allocate appropriate bandwidth for the connection.

Preferably the base station further comprises:

bandwidth allocation means for allocating bandwidth in the base station for each connection defined by the connection defining means;

wherein the connection notifying means is arranged to inform the relay station of the connection information without waiting for the bandwidth allocation means to allocate bandwidth for that connection in the base station.

According to a second aspect of the present invention, there is provided a relay station for use in a wireless communication system in which packets of data are transmitted over connections between a base station and any of a plurality of subscriber stations via the relay station, the packets of data being transmitted in accordance with one of a plurality of service classes, the base station approving connections requested by the subscriber station and allocating available bandwidth in the base station for each of the approved connections in accordance with their service classes, the relay station comprising:

service class determining means for receiving connection information associated with a connection newly approved by the base station; and bandwidth allocation means for allocating bandwidth for the connection in the relay station based on the received connection information.

Preferably, the bandwidth allocation means is arranged to allocate bandwidth without waiting for the base station to allocate bandwidth in the base station.

Other aspects of the invention provide a wireless communication system and a computer program as set forth in the accompanying independent claims.

Thus, embodiments of the present invention can reduce the latency of bandwidth requests in a multi-hop wireless communication system by ensuring that the base station shares connection information (preferably including QoS information or information derived therefrom) with each relay station. This can be achieved either by the base station explicitly informing the relay station of the QoS information, or by the relay station parsing packets intended for a subscriber station to determine the QoS information. The QoS includes (or is used to derive) timing information used by the relay station to determine when to allocate bandwidth to the connection. In this way, bandwidth allocation in a multi-hop relay wireless communication system is improved by allowing the relay station to allocate radio resources based on QoS.

BRIEF DESCRIPTION OF THE DRAWINGS

Reference is made, by way of example only, to the accompanying drawings in which.

MODE(S) FOR CARRYING OUT THE INVENTION

An embodiment of the present invention will now be described with reference to FIGS. 7-13, using an IEEE 802.16 network as an example.

Figure 1:
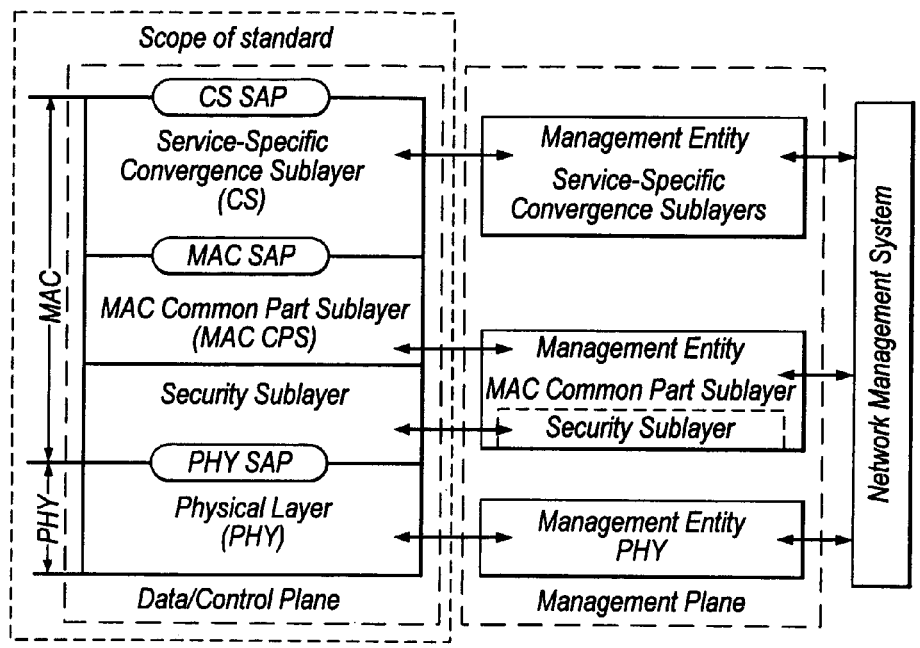
FIG. 1 shows protocol layering in accordance with IEEE 802.16.
Figure 2:
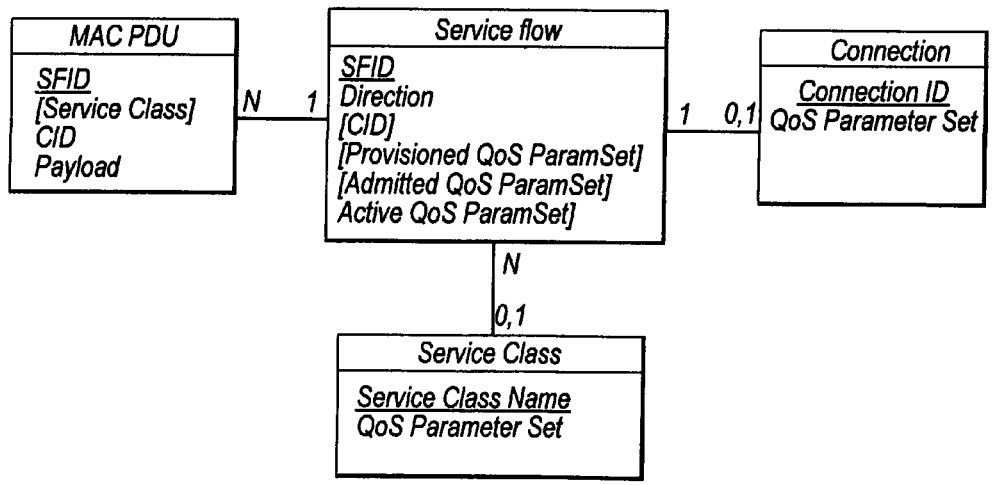
FIG. 2 shows the relationship between CID, SFID and QoS in an IEEE 802.16 network.
Figure 3:
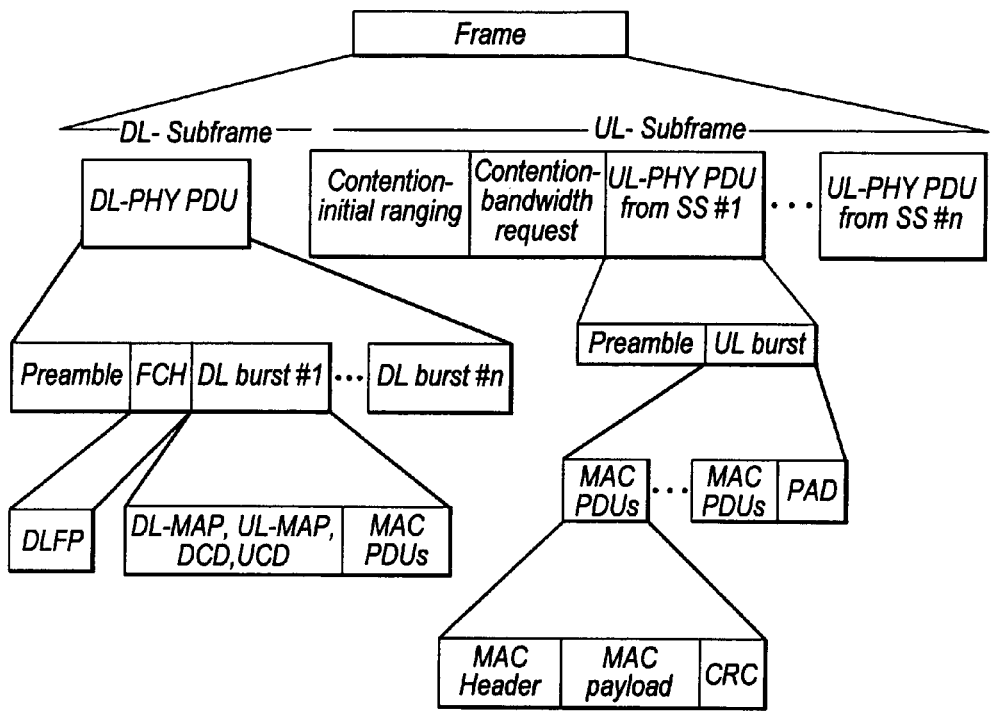
FIG. 3 shows a TDD frame format capable of being used in an IEEE 802.16 network.
Figure 4:
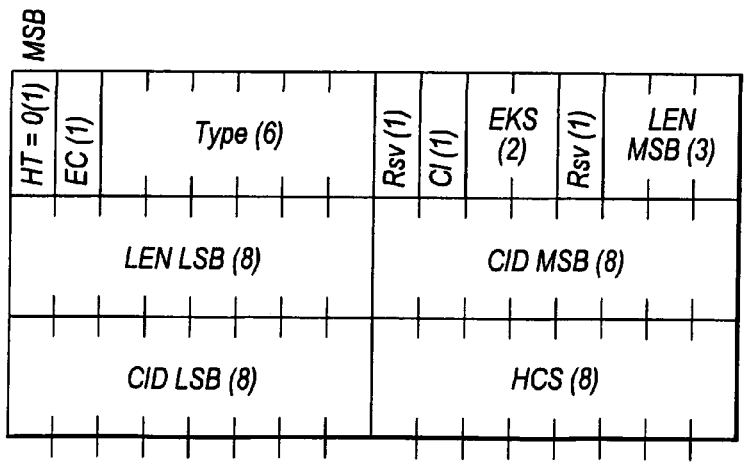
FIG. 4 shows a generic MAC header of a packet as set forth in the IEEE 802.16 specification.
Figure 5:
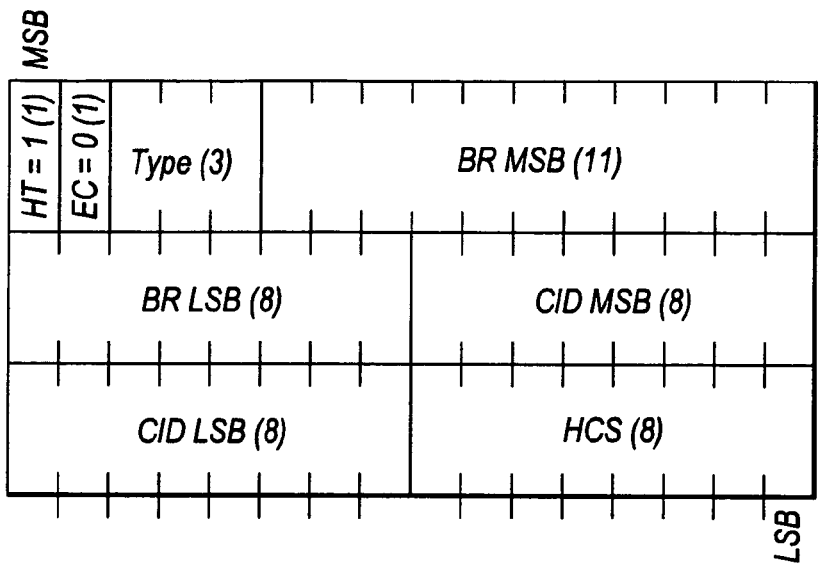
FIG. 5 shows a generic bandwidth request header of a packet.
Figure 6:
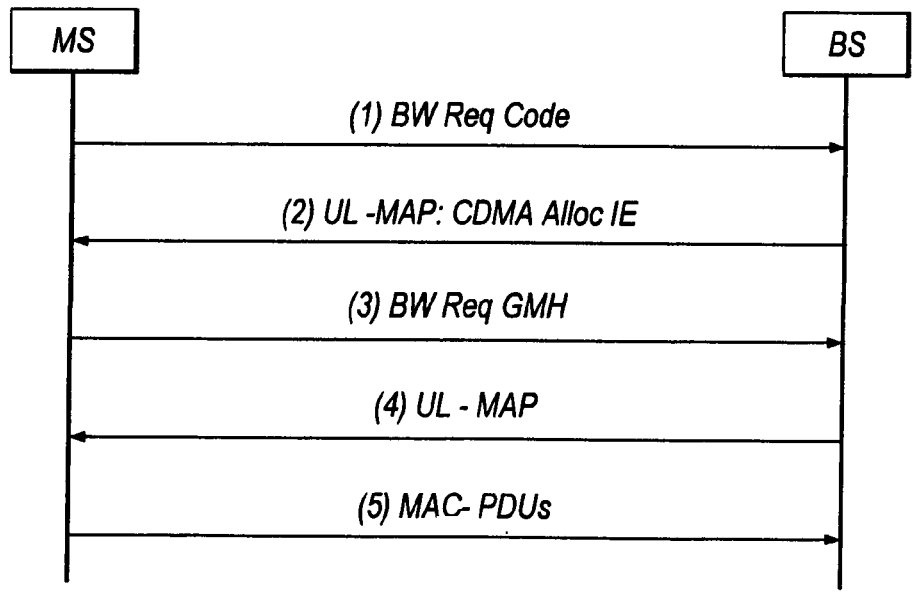
FIG. 6 shows a conventional bandwidth request process in the case of a direct connection between a mobile station and a base station.
Figure 7:
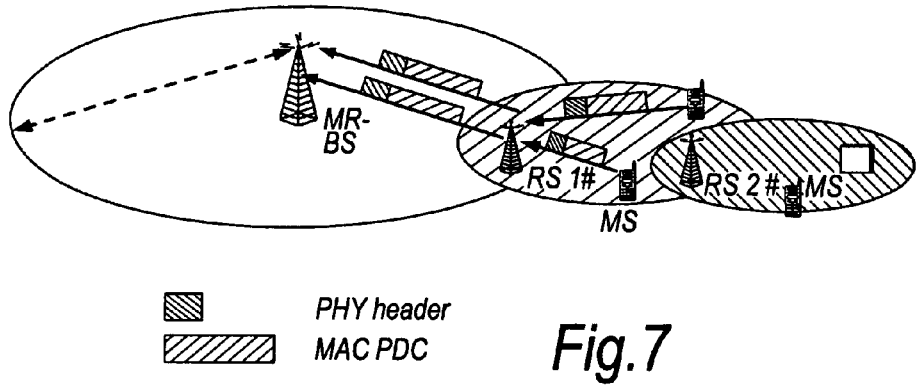
FIG. 7 illustrates a multi-hop (MR) wireless communication system.
Figure 8:
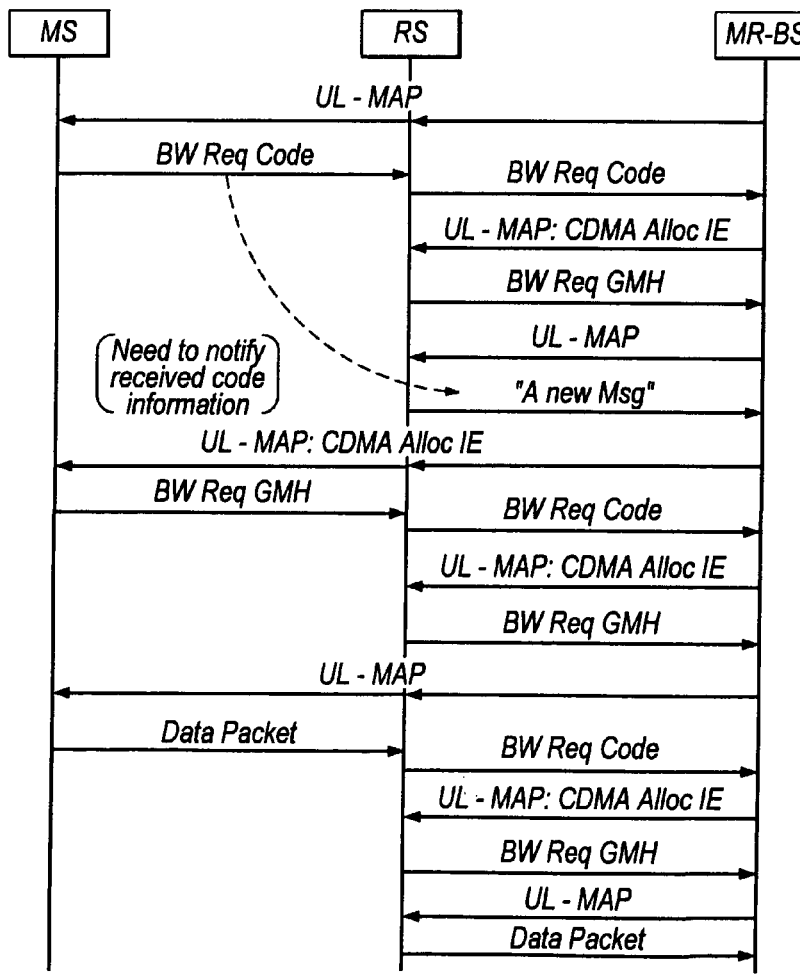
FIG. 8 shows a bandwidth request process in the case of a multi-hop connection between a mobile station and a base station.

Consider again the MR system schematically illustrated in FIG. 7. To obtain UGS service within such a system, MS does not need to send a bandwidth request to get UL bandwidth allocation. MR-BS must allocate UL bandwidth to UGS connection automatically (unsolicitedly). On the other hand, the BS must allocate bandwidth based on the QoS information within DS-REQ/RSP messages during the connection setup phase, namely based on an "Unsolicited grant interval" TLV. If there is no timing synchronization between MR-BS and RS, UGS latency could be degraded in MR systems.

Figure 9:
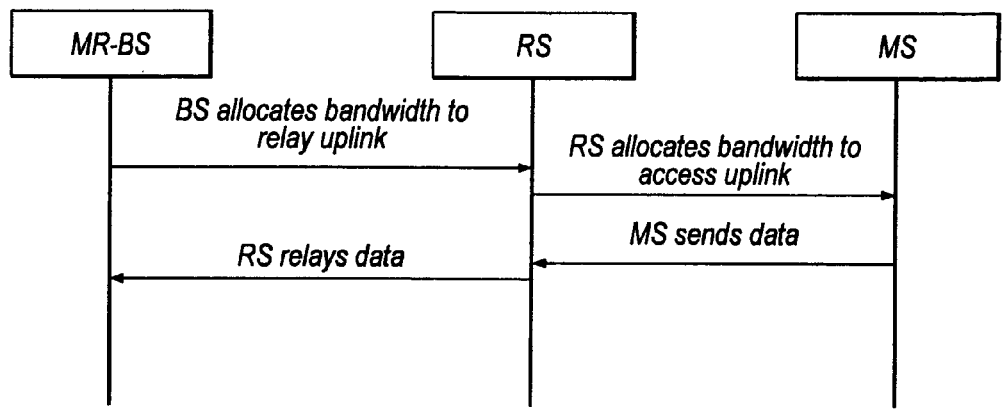
FIG. 9 illustrates the delay inherent in the relay station waiting for the base station to allocate bandwidth in the system of FIG. 7.
Figure 10:
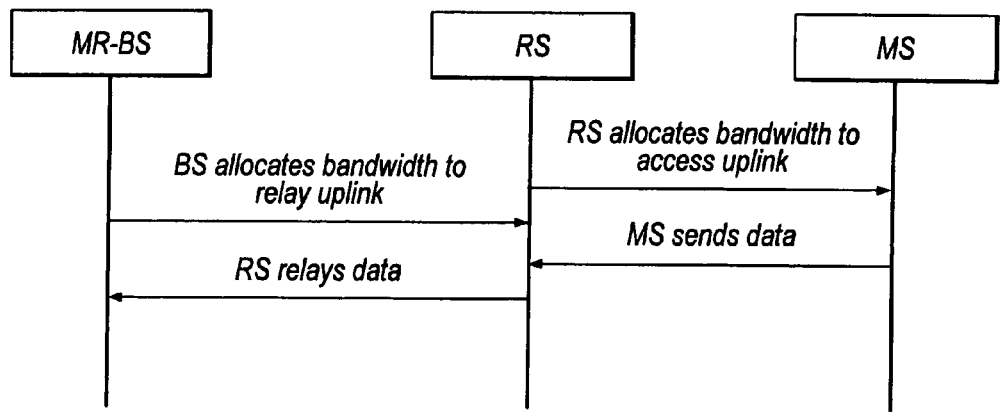
FIG. 10 illustrates bandwidth allocation according to the present invention.

As shown in FIG. 9, if RS doesn't know the appropriate timing at which to grant bandwidth to a UGS service in an SS, it will wait for the BS to allocate bandwidth first, thus degrading the latency performance. If RS can know the time to allocate bandwidth to a UGS service in an SS, it can allocate the bandwidth to SS without waiting for the BS to allocate bandwidth, as shown in FIG. 10, thus decreasing the latency of a UGS service.

On the other hand, the RS with distributed scheduling needs to know the QoS information of different service classes for its scheduler algorithm. To decrease the latency of bandwidth in MR system, and to support the scheduler algorithms, RS has to know the QoS demands and the bandwidth allocating requirements.

Figure 11:
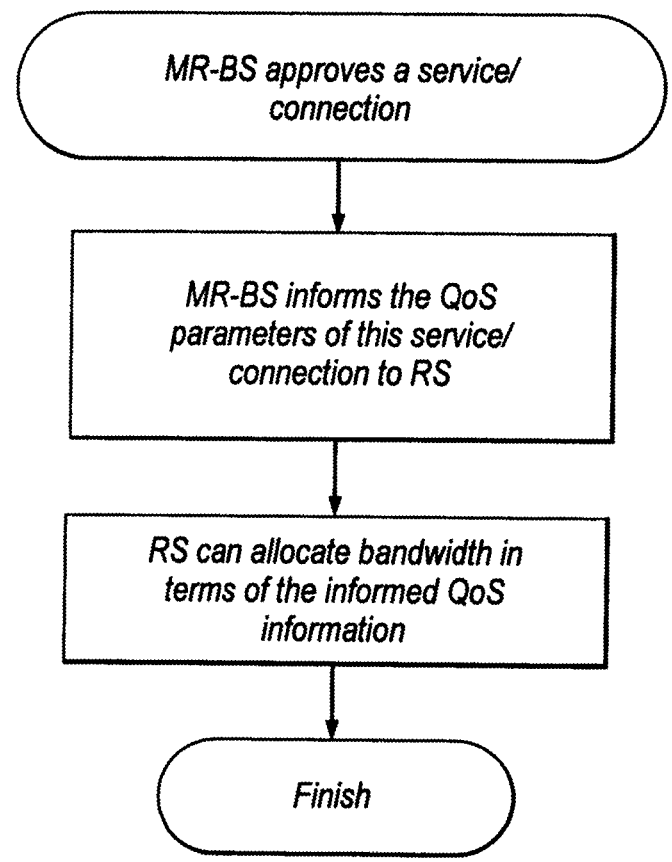
FIG. 11 is a flowchart of basic processing in the base station and relay station in an embodiment of the present invention.

In one embodiment of the present invention illustrated in FIG. 11, the MR-BS shares the QoS information with the RS after the MR-BS decides to approve a service or connection. That is, this information is communicated (directly or indirectly) without waiting for bandwidth allocation to take place at the base station. In this method, as soon as the MR-BS decides to approve a service or connection, the MR-BS shares the QoS information, indicating as the time interval between successive bandwidth grants, data rate, throughput etc., with the RS. Then the RS allocates bandwidth to SS or performs its own scheduler algorithm for SS based on the known QoS parameters. MR-BS can use a special message containing the QoS information or MAP IE (which may be part of the DL-subframe as mentioned above) containing the QoS information, to inform the QoS information to RS.

Alternatively, the RS can snoop the messages between MR-BS and MS to determine the QoS information. RS can use this QoS information to schedule the bandwidth allocation and the scheduler algorithm. Here, "snooping" refers to parsing packets rather than simply relaying them as in a conventional relay station. More precisely, the RS is arranged to examine the MAC PDUs of received packets. In a conventional IEEE802.16 system, the RS decodes received packets and re-encodes them for relaying on to their destination, but does not parse the received packets.

Figure 12:
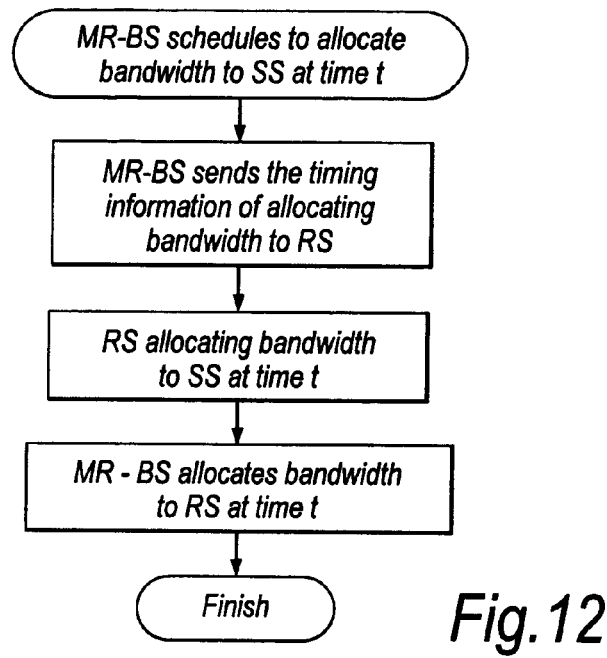
FIG. 12 is a first flowchart of processing timing information in the base station and relay station.
Figure 13:
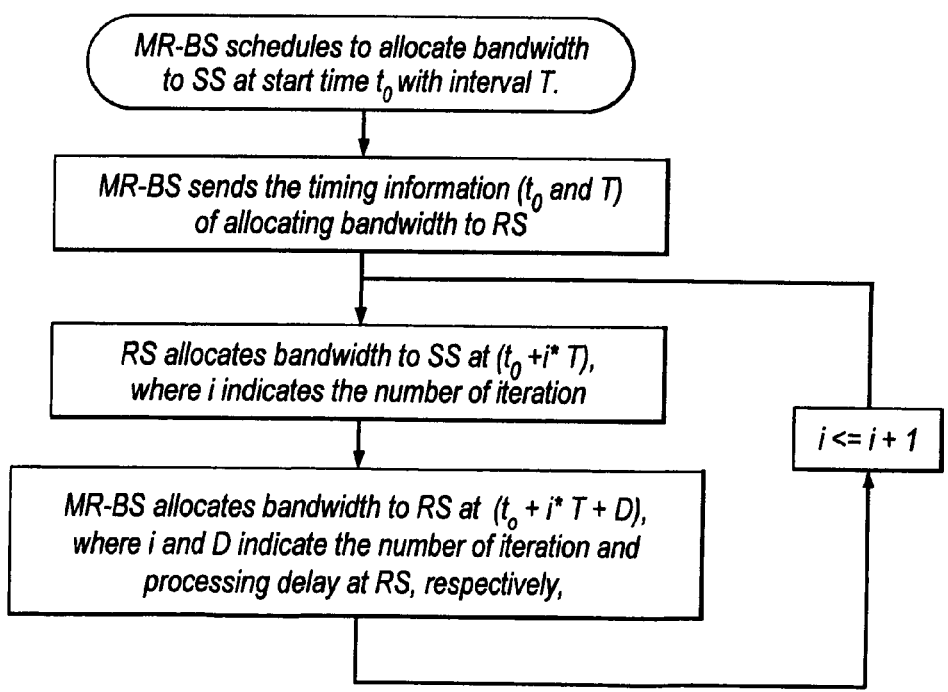
FIG. 13 is a second flowchart of processing timing information in the base station and relay station.

By means of the present invention, the MR-BS informs RS of the timing at which the RS needs to allocate bandwidth to MS. This is done either indirectly, by sharing the QoS information as shown in FIG. 11 so that the RS can easily derive or extract timing information, or directly, as shown in FIG. 12. FIG. 12 shows an embodiment in which an explicit timing message is sent from the MR-BS to the RS. Timing is preferably expressed in terms of frames, and may be either absolute or relative time. As before the MR-BS can send a special message to RS or use a MAP IE to inform the bandwidth allocating time to RS. In either case, the RS can use this timing information to allocate bandwidth to MS on time. When bandwidth needs to be allocated periodically to MS, MR-BS also can inform the start time t0 and interval T of allocating bandwidth to RS, thus RS can periodically allocate bandwidth to MS, as shown in FIG. 13. Preferably, in the case of an explicit timing message from the MR-BS, the start time for allocation of bandwidth in the MR-BS itself should also be included.

In this instance, it is possible for the MR-BS to build in a time delay (D in FIG. 13) for its own bandwidth grants so as to synchronise with operations in the RS. That is, by estimating the processing time for the RS to receive and act upon the timing information sent from the MR-BS, or alternatively by receiving a notification of this processing time from the RS, the MR-BS can grant the bandwidth at the appropriate timing to coincide with bandwidth allocation in the RS, thus avoiding premature use of bandwidth at the MR-BS.

Although the above description concerns the processing in a single RS and BS, other relay stations may be present in the network. In this case, in relation to each other RS, the first RS may act like the BS in the above explanation. Each other RS will serve its own set of subscriber stations and perform its own bandwidth allocation and scheduling in the same manner as explained above for the first RS.

Although the above embodiments involve the RS being made aware of QoS information, it is not essential for the whole of the QoS information (possibly including several QoS parameters as mentioned above, not all of which may be needed for bandwidth allocation) to be communicated to the RS, nor is it necessary to use the QoS information itself; instead, information derived from QoS may be employed. This is referred to in the claims by the term "connection information".

Embodiments of the present invention may be implemented in hardware, or as software modules running on one or more processors, or on a combination thereof. That is, those skilled in the art will appreciate that a microprocessor or digital signal processor (DSP) may be used in practice to implement some or all of the functionality of the RS or BS in the present invention. It is also possible to provide each SS with some or all of the functionality of the RS. The invention may also be embodied as one or more device or apparatus programs (e.g. computer programs and computer program products) for carrying out part or all of any of the methods described herein. Such programs embodying the present invention may be stored on computer-readable media, or could, for example, be in the form of one or more signals. Such signals may be data signals downloadable from an Internet website, or provided on a carrier signal, or in any other form.

INDUSTRIAL APPLICABILITY

Thus, the present invention provides a multi-hop wireless communication system in which packets of data are transmitted over a connection between a base station (MR-BS) and a subscriber station (SS) via at least one relay station (RS), the packets of data being transmitted in accordance with one of a plurality of service classes each having a respective QoS, and available bandwidth in the system being shared among a plurality of such connections in accordance with their service classes. To decrease the latency of bandwidth allocation in the system, and to support its scheduler algorithm, the RS should be aware of the QoS demands and the bandwidth allocating requirements of each connection. To achieve this, the MR-BS shares the QoS information with the RS immediately upon deciding to approve a new connection. This may involve informing the RS, directly or indirectly, of timing information such as the time interval between successive bandwidth grants, data rate, throughput etc. The RS then allocates bandwidth to the SS and/or performs its scheduler algorithm based on the known QoS parameters. The MR-BS can use an message or MAP IE to inform the QoS information to RS. Alternatively, the RS can snoop the messages between MR-BS and MS to determine the QoS information. The technique is especially effective in the case of providing a UGS connection to the MS.

In summary, the benefits of the present invention are:

To allow the RS to know the QoS information and the requirements of allocating bandwidth to SS, in this way, the RS has enough information for bandwidth allocating and scheduler algorithms.

To make MR systems meet the QoS demands of various service classes, especially for the UGS service.

What is claimed is:

1. A base station for use in a wireless communication system in which packets of data are transmitted over a connection between the base station and a subscriber station via at least one relay station, wherein the base station is arranged to approve said connection with the subscriber station, said connection having one of a plurality of service classes in accordance with which packets of data are transmitted, each service class having a respective QoS demand, the base station comprising:

connection notifying unit for informing the relay station of connection information for assisting the relay station to allocate resource within frame for said connection, the connection information generated by the base station and associated with the service class of said connection; and resource allocation unit for sharing available bandwidth among a plurality of connections in accordance with their service classes, the resource allocation unit arranged to allocate resource for a transmission of data over said connection from the relay station to the base station, after the relay station allocates resource for a transmission of data over said connection from the subscriber station to the relay station in accordance with the connection information.

2. A non-transitory computer-readable medium on which is recorded computer software which, when executed by a processor of a serving station in a wireless communication system, provides the base station according to claim 1.

3. The base station according to claim 1 wherein the connection information includes timing information on timing of bandwidth allocation in the relay station.

4. The base station according to claim 3 wherein the timing information includes a time interval for allocation of bandwidth or additional bandwidth in the relay station.

5. The base station according to claim 3 wherein the timing information includes a start time at which the relay station is to allocate bandwidth to the connection and a start time at which the base station is to allocate bandwidth to the connection.

6. A relay station for use in a wireless communication system in which packets of data are transmitted over connections between a base station and any of a plurality of subscriber stations via the relay station, the base station approving connections requested by the subscriber station and allocating available bandwidth in the base station for each of the approved connections, the relay station comprising:

service class determining unit for receiving connection information for assisting the relay station to allocate resource within frame for a connection with the subscriber station, said connection having one of a plurality of service classes in accordance with which bandwidth is allocated and packets of data are transmitted, each service class having a respective QoS demand, the connection information generated by the base station and associated with the service class of said connection; and resource allocation unit for allocating resource for a transmission of the data over said connection from the subscriber station to the relay station in accordance with the connection information.

7. The relay station according to claim 6 wherein the bandwidth allocation means is arranged to allocate bandwidth without waiting for the base station to allocate bandwidth in the base station.

8. The relay station according to claim 6 wherein the connection information includes timing information for assisting the bandwidth allocation means to allocate bandwidth to the connection.

9. The relay station according to claim 8 wherein the timing information includes an indication of at least one of: (i) a start time at which the relay station is to provide bandwidth to the connection and (ii) a time interval for providing bandwidth or additional bandwidth in the relay station.

10. A non-transitory computer-readable medium on which is recorded computer software which, when executed by a processor of a serving station in a wireless communication system, provides the relay station according to claim 6.

11. A wireless communication system in which packets of data are transmitted over a connection between a base station and a subscriber station via at least one relay station, wherein the base station is arranged to approve said connection with the subscriber station, said connection having one of a plurality of service classes in accordance with which packets of data are transmitted, each service class having a respective QoS demand, and the base station comprises: connection notifying unit for informing the relay station of connection information for assisting the relay station to allocate resource within frame for said connection, the connection information generated by the base station and associated with the service class of said connection having one of said service classes with the subscriber station; and base station resource allocation unit for sharing available bandwidth among a plurality of connections in accordance with their service classes, the base station resource allocation unit arranged to allocate resource for a transmission of data over said connection from the relay station to the base station; and the relay station comprises relay station resource allocation unit for allocating resource for a transmission of the data over said connection from the subscriber station to the relay station in accordance with the connection information.

12. The wireless communication system according to claim 11, wherein the relay station bandwidth allocation means is arranged to allocate the bandwidth for the connection in the relay station without waiting for the base station bandwidth allocation means to allocate bandwidth for that connection in the base station.

13. The system according to claim 11, wherein the base station is arranged to notify the relay station explicitly of the connection information.

14. The system according to claim 11, wherein the relay station includes service class determining means for examining one or more packets intended for the subscriber station in order to determine the connection information.

15. The system according to claim 11 wherein the connection information includes timing information for use in determining the timing of bandwidth allocation in the relay station, the timing information being employed by the bandwidth allocation means of the base station and modified by a time delay to account for processing time in the relay station, so that bandwidth allocation in the base station and relay station are synchronised.

* * * * *